United States Patent
Sadaki et al.

(10) Patent No.: US 11,305,512 B2
(45) Date of Patent: Apr. 19, 2022

(54) ROLL-BONDED LAMINATE AND METHOD FOR PRODUCING THE SAME

(71) Applicant: Toyo Kohan Co., Ltd., Tokyo (JP)

(72) Inventors: Kota Sadaki, Kudamatsu (JP); Takashi Koshiro, Kudamatsu (JP); Takafumi Hatakeda, Kudamatsu (JP)

(73) Assignee: Toyo Kohan Co., Ltd., Tokyo (JP)

( * ) Notice: Subject to any disclaimer, the term of this patent is extended or adjusted under 35 U.S.C. 154(b) by 69 days.

(21) Appl. No.: 16/498,946

(22) PCT Filed: Mar. 29, 2018

(86) PCT No.: PCT/JP2018/013170
§ 371 (c)(1),
(2) Date: Sep. 27, 2019

(87) PCT Pub. No.: WO2018/181684
PCT Pub. Date: Oct. 4, 2018

(65) Prior Publication Data
US 2021/0107254 A1    Apr. 15, 2021

(30) Foreign Application Priority Data

Mar. 29, 2017 (JP) .............................. JP2017-066268
Dec. 22, 2017 (JP) .............................. JP2017-246926

(51) Int. Cl.
*B32B 15/01* (2006.01)
*B21B 1/22* (2006.01)
(Continued)

(52) U.S. Cl.
CPC .............. *B32B 15/012* (2013.01); *B21B 1/22* (2013.01); *B23K 20/04* (2013.01); *B32B 37/10* (2013.01);
(Continued)

(58) Field of Classification Search
None
See application file for complete search history.

(56) References Cited

U.S. PATENT DOCUMENTS

| | | |
|---|---|---|
| 3,711,937 A | 1/1973 | Emley |
| 2017/0014941 A1 | 1/2017 | Nanbu et al. |
| 2017/0014942 A1 | 1/2017 | Nanbu et al. |

FOREIGN PATENT DOCUMENTS

| | | |
|---|---|---|
| JP | 48-20747 | 3/1973 |
| JP | 50-73868 | 6/1975 |

(Continued)

OTHER PUBLICATIONS

International Search Report based on co-pending International Application No. PCT/JP2018/013170, dated May 22, 2018—2 Pages.

(Continued)

*Primary Examiner* — Daniel J. Schleis
(74) *Attorney, Agent, or Firm* — McCarter & English, LLP

(57) ABSTRACT

This invention provides a roll-bonded laminate that is excellent in press workability and/or a roll-bonded laminate with improved performance and ease of handling at the time of production. More specifically, this invention relates to a roll-bonded laminate composed of a stainless steel layer and an aluminum alloy layer with the peel strength of 60 N/20 mm or higher, a roll-bonded laminate composed of a stainless steel layer and a pure aluminum layer with the peel strength of 160 N/20 mm or higher, and a roll-bonded laminate composed of a pure titanium or titanium alloy layer and an aluminum alloy layer with the peel strength of 40 N/20 mm or higher.

9 Claims, 5 Drawing Sheets

(51) Int. Cl.
- *B23K 20/04* (2006.01)
- *B32B 37/10* (2006.01)
- *B32B 38/00* (2006.01)
- *C21D 1/26* (2006.01)
- *C21D 9/00* (2006.01)
- *C22C 21/06* (2006.01)

(52) U.S. Cl.
CPC ............ *B32B 38/0036* (2013.01); *C21D 1/26* (2013.01); *C21D 9/0012* (2013.01); *C22C 21/06* (2013.01); *B32B 2038/0048* (2013.01); *B32B 2307/54* (2013.01); *B32B 2307/732* (2013.01); *B32B 2311/18* (2013.01); *B32B 2311/24* (2013.01); *B32B 2311/30* (2013.01); *Y10T 428/12757* (2015.01)

(56) References Cited

FOREIGN PATENT DOCUMENTS

| | | |
|---|---|---|
| JP | 61-42498 | 2/1986 |
| JP | 63252682 | 10/1988 |
| JP | H01224184 | 9/1989 |
| JP | 8-336929 | 12/1996 |
| JP | 11-319970 | 11/1999 |
| JP | 2000312979 | 11/2000 |
| JP | 2004306458 | * 11/2004 |
| JP | 2005-21899 | 1/2005 |
| JP | 2005021899 A | * 1/2005 |
| JP | 2015-196178 | 11/2015 |
| KR | 10-2017-0018569 | 2/2017 |
| WO | 2015/152041 | 10/2015 |

OTHER PUBLICATIONS

Japanese Office Action in co-pending Japanese Patent Application No. 2018-139377, dated Dec. 7, 2021—pp. 1-4.

* cited by examiner

ROLL-BONDED LAMINATE AND METHOD FOR PRODUCING THE SAME

CROSS-REFERENCE TO RELATED APPLICATIONS

This application is a national stage application filed under 35 USC 371 of PCT/JP2018/013170, filed Mar. 29, 2018, which claims the benefit of Japanese Patent Application No. 2017-066268, filed Mar. 29, 2017 and Japanese Patent Application No. 2017-246926, filed Dec. 22, 2017, each of which is incorporated herein, in its entirety, by reference.

TECHNICAL FIELD

The present invention relates to a roll-bonded laminate and a method for producing the same.

BACKGROUND ART

Metallic materials are used in a wide variety of fields. For example, metallic materials are used as press-molded parts for electronic devices, such as mobile electronic devices (mobile terminals). Such metallic materials are required to exhibit high-level press workability. As such metallic materials, roll-bonded laminates (e.g., metal laminated materials or clad materials) comprising two or more types of metal plates or metal foils laminated on top of each other are known, in addition to a metallic material consisting of a single type of metal. A roll-bonded laminate is a sophisticated metallic material with multiple properties that cannot be achieved by a single material. For example, a roll-bonded laminate composed of stainless steel and aluminum superposed on top of the other has been studied.

For example, a radiator plate of a press-molded part for an electronic device using a roll-bonded laminate is generally formed via bending work. An electronic device housing, in particular, the outermost housing is generally formed via drawing work. Through drawing work, a flat roll-bonded laminate is immobilized on a die, and a hole provided on a die is punched to form a container. Thus, drawing work is more difficult to perform than bending work.

As a method for producing a roll-bonded laminate of stainless steel and aluminum, for example, a method involving cold rolling bonding or warm rolling bonding has been known. In the case of cold rolling bonding, however, a large processing strain is caused on stainless steel, hardness thereof is excessively increased, and elongation is insufficient while strength is increased. Accordingly, a roll-bonded laminate produced via cold rolling bonding can be used in the form of a flat plate, and it can be moderately processed. However, molding via bending work is not easy, and molding via drawing work is more difficult. In the case of warm rolling bonding, aluminum is difficult to handle, and aluminum is easily deformed at the time of bonding. Thus, it is difficult to produce a laminate having even thickness, thickness of a part of a laminate is reduced at the time of roll bonding, and workability may thus be extremely deteriorated.

With regard to such technique, Patent Literature 1 discloses a technique of producing a roll-bonded laminate of stainless steel and aluminum in which surfaces to be bonded are activated by sputter etching, so as to suppress an increase in hardness of stainless steel.

While a roll-bonded laminate could be molded via stretch work or bending work according to the production method disclosed in Patent Literature 1, a roll-bonded laminate molded via drawing work may occasionally suffer from fracture or wrinkling. That is, drawing workability was not always sufficient.

In addition to the roll-bonded laminate of stainless steel and aluminum, a roll-bonded laminate of titanium and aluminum is also examined. For example, Patent Literature 2 discloses a titanium/aluminum clad plate for a building material in which a thickness ratio of a titanium layer is adjusted within a given range. In the case of a conventional roll-bonded laminate of titanium and aluminum, however, the adhesion force between the titanium layer and the aluminum layer is not always sufficient. Accordingly, improvement in performance and handling at the time of production has been awaited.

CITATION LIST

Patent Literature

Patent Literature 1: WO 2015/152041
Patent Literature 2: JP H08-336929 A

SUMMARY OF INVENTION

Technical Problem

As described above, drawing workability of a conventional roll-bonded laminate may not be sufficient even if bending workability is sufficient. Accordingly, an improvement in press workability had been desired. Therefore, it is an object of the present invention to provide a roll-bonded laminate that is excellent in press workability. It is another object of the present invention to provide a roll-bonded laminate exhibiting an improvement in performance and handling at the time of production.

Solution to Problem

The present inventors have conducted concentrated studies in order to attain the above objects. As a result, they discovered that the enhanced adhesion force between stainless steel and aluminum of a roll-bonded laminate of stainless steel and aluminum would improve drawing workability of the roll-bonded laminate to a significant extent and that the enhanced adhesion force between titanium and aluminum of a roll-bonded laminate of titanium and aluminum would improve performance and handling at the time of production. This has led to the completion of the present invention. Specifically, the present invention is summarized as follows.

(1) A roll-bonded laminate composed of a stainless steel layer and an aluminum alloy layer, wherein the aluminum alloy contains 1 or more additive metal elements selected from Mg, Mn, Si, and Cu, the total content of the additive metal elements exceeds 1% by mass, and peel strength of the roll-bonded laminate is 60 N/20 mm or higher.
(2) The roll-bonded laminate according to (1), wherein the aluminum alloy layer has thickness of 0.01 mm to 2.5 mm.
(3) The roll-bonded laminate according to (2), wherein elongation measured by a tensile test is 35% or higher.
(4) The roll-bonded laminate according to (3), wherein tensile strength measured by a tensile test with the use of Specimens No. 6 specified by JIS Z 2201 is 3,000 N or higher.
(5) The roll-bonded laminate according to any of (2) to (4), wherein a limiting drawing ratio is 1.20 or higher.

(6) The roll-bonded laminate according to any of (1) to (5), wherein a standard deviation of thickness of the stainless steel layer is 2.0 μm or lower.
(7) The roll-bonded laminate according to any of (1) to (6), wherein the aluminum alloy layer has thickness of larger than thickness of the stainless steel layer.
(8) The roll-bonded laminate according to any of (1) to (7), wherein the aluminum alloy contains Mg in an amount of 0.3% by mass or more.
(9) A method for producing the roll-bonded laminate according to any of (1) to (8) comprising:
   subjecting the surface of the stainless steel plate and the surface of the aluminum alloy plate to be bonded to each other to sputter etching;
   pressure bonding the surfaces subjected to sputter etching to each other at a reduction ratio of the aluminum alloy layer of 5% or higher and a reduction ratio of the roll-bonded laminate of 15% or lower; and
   performing batch annealing at 200° C. to 370° C. or continuous annealing at 300° C. to 800° C.
(10) A roll-bonded laminate composed of a stainless steel layer and a pure aluminum layer, wherein the total content of additive metal elements in pure aluminum is 1% by mass or less and the peel strength of the roll-bonded laminate is 160 N/20 mm or higher.
(11) A method for producing the roll-bonded laminate according to (10) comprising:
   subjecting the surface of the stainless steel plate and the surface of the pure aluminum plate to be bonded to each other to sputter etching;
   pressure bonding the surfaces subjected to sputter etching to each other at a reduction ratio of the pure aluminum layer of 10% or higher and a reduction ratio of the roll-bonded laminate of 20% or lower; and
   performing batch annealing at 200° C. to 500° C. or continuous annealing at 300° C. to 800° C.
(12) A roll-bonded laminate composed of a pure titanium or titanium alloy layer and an aluminum alloy layer, wherein the aluminum alloy contains 1 or more additive metal elements selected from Mg, Mn, Si, and Cu, the total content of the additive metal elements exceeds 1% by mass, and the peel strength of the roll-bonded laminate is 40 N/20 mm or higher.
(13) A method for producing the roll-bonded laminate according to (12) comprising:
   subjecting the surface of the pure titanium or titanium alloy plate and the surface of the aluminum alloy plate to be bonded to each other to sputter etching;
   pressure bonding the surfaces subjected to sputter etching to each other at a reduction ratio of the aluminum alloy layer of 7% or higher and a reduction ratio of the roll-bonded laminate of 20% or lower; and
   performing batch annealing at 200° C. to 500° C. or continuous annealing at 300° C. to 800° C.

This description includes part or all of the content as disclosed in Japanese Patent Application Nos. 2017-066268 and 2017-246926, which are priority documents of the present application.

Advantageous Effects of Invention

The present invention can provide a roll-bonded laminate that is excellent in press workability. Such roll-bonded laminate can be preferably used as a press-molded part for an electronic device, such as a mobile electronic device (mobile terminal) housing with the utilization of high press workability. The present invention can also provide a roll-bonded laminate exhibiting an improvement in performance and handling at the time of production.

DESCRIPTION OF EMBODIMENTS

Figure 1:
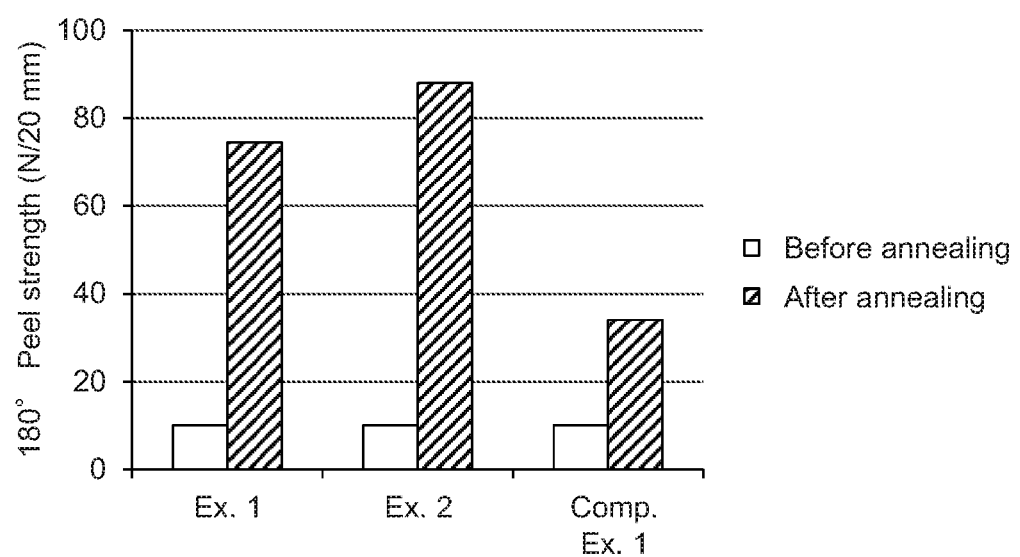
FIG. 1 shows the peel strength of the roll-bonded laminates of Examples 1 and 2 and Comparative Example 1 before and after annealing.

Hereafter, the present invention is described in detail.
The present invention relates to a roll-bonded laminate composed of a stainless steel layer and an aluminum layer and a roll-bonded laminate composed of a titanium layer and an aluminum layer.
The roll-bonded laminate according to the present invention that is composed of a stainless steel layer and an aluminum layer comprises a stainless steel (SUS) layer and an aluminum alloy (Al alloy) or pure aluminum (pure Al) layer. Accordingly, the roll-bonded laminate according to the present invention comprises 2 or more layers, preferably 2 to 4 layers, and more preferably 2 or 3 layers.
A roll-bonded laminate according to a preferable embodiment is a bi-layer roll-bonded laminate of SUS/Al alloy and SUS/pure Al, or it is a tri-layer roll-bonded laminate of SUS/Al alloy/SUS, SUS/pure Al/SUS, Al alloy/SUS/Al alloy, or pure Al/SUS/pure Al. In the present invention, a structure of a roll-bonded laminate can be selected in accordance with the application or properties of interest of the roll-bonded laminate.

I. A Roll-Bonded Laminate Composed of a Stainless Steel Layer and an Aluminum Alloy Layer According to the first embodiment of the present invention, the roll-bonded laminate is composed of a stainless steel layer and an aluminum alloy layer.
As an aluminum alloy used for an aluminum alloy layer, an aluminum alloy plate in which the total content of the additive metal elements (i.e., at least one additive metal element selected from Mg, Mn, Si, and Cu as a metal element other than aluminum) exceeds 1% by mass can be used.
For example, aluminum alloys defined by JIS, such as Al—Cu-base alloy (2000 series), Al—Mn-base alloy (3000 series), Al—Si-base alloy (4000 series), Al—Mg-base alloy (5000 series), Al—Mg—Si-base alloy (6000 series), and Al—Zn—Mg-base alloy (7000 series), can be used. From the viewpoint of press workability, strength, and corrosion resistance, aluminum alloys of 3000 series, 5000 series, 6000 series, and 7000 series are preferable. From the viewpoint of the balance between such properties and cost, an aluminum alloy of 5000 series is more preferable. An aluminum alloy preferably contains Mg in an amount of 0.3% by mass or more.

As stainless steel used for a stainless steel layer, for example, a stainless steel plate SUS304, SUS201, SUS316, SUS316L, or SUS430 can be used, although stainless steel is not limited thereto.

Thickness of the roll-bonded laminate is not particularly limited. It is generally 0.045 mm to 3.0 mm, the upper limit is preferably 2.0 mm or less, and more preferably 1.7 mm or less, and the lower limit is preferably 0.1 mm or more, and more preferably 0.7 mm or more. Thickness of the roll-bonded laminate is a total thickness of the stainless steel layer and the aluminum alloy layer. Thickness of the roll-bonded laminate is an average of thickness measured at arbitrary 30 points on the roll-bonded laminate with the use of, for example, a micrometer.

In general, an aluminum alloy layer with thickness of 0.01 mm or more can be used. From the viewpoint of mechanical strength and workability of the roll-bonded laminate, the lower limit is preferably 0.1 mm or more, and more preferably 0.5 mm or more. As aluminum alloy layer thickness is increased, drawing workability is likely to be enhanced. When a layer is excessively thick, however, a curvature is increased when used for applications involving drawing work or bending work. Thus, the stainless steel layer may be extended and broken therefrom. From the viewpoint of weight reduction and cost, thickness is preferably 3.0 mm or less, more preferably 2.5 mm or less, further preferably 2.00 mm or less, furthermore preferably 1.7 mm or less, and particularly preferably 0.82 mm or less. Aluminum alloy layer thickness is preferably 0.01 mm to 2.5 mm. Aluminum alloy layer thickness is preferably larger than stainless steel layer thickness. When aluminum alloy plate material is excessively thick such that an aluminum alloy layer of the roll-bonded laminate has thickness of 0.6 mm or more, in general, an aluminum alloy plate is less likely to be bonded to another metal plate. According to the present invention, however, an aluminum alloy plate can be easily bonded to a stainless steel plate even if an aluminum alloy layer is excessively thick. In addition, a roll-bonded laminate having high peel strength and excellent drawing workability can be obtained. When a roll-bonded laminate comprises 2 or more aluminum alloy layers, aluminum alloy layer thickness of the roll-bonded laminate is thickness of each aluminum alloy layer. Thickness of an aluminum alloy layer of the roll-bonded laminate is determined by obtaining an optical microscopic photograph of a cross section of the roll-bonded laminate, measuring thickness of the aluminum alloy layer at arbitrary 10 points in the optical microscopic photograph, and calculating the average thickness. When producing a roll-bonded laminate, an aluminum alloy plate material is bonded at a given reduction ratio. Thus, thickness of the aluminum alloy layer of the roll-bonded laminate becomes smaller than that of the aluminum alloy plate before bonding.

A standard deviation of aluminum alloy layer thickness is preferably 6.0 μm or less, more preferably 3.0 μm or less, and particularly preferably 2.0 μm or less. A standard deviation of aluminum alloy layer thickness is determined by obtaining an optical microscopic photograph of a cross section of the roll-bonded laminate, measuring thickness of the aluminum alloy layer at 10 points at equal intervals on a cross section over a width of 300 μm in the optical microscopic photograph, and calculating the standard deviation from the values measured at the 10 points.

In general, a stainless steel layer with thickness of 0.01 mm or more can be used. From the viewpoint of drawing workability and strength, the lower limit is preferably 0.045 mm or more, and more preferably 0.1 mm or more. While the upper limit is not particularly limited, elongation and drawing workability may be deteriorated when a stainless steel layer is excessively thick relative to the aluminum layer. Thus, the upper limit is preferably 0.5 mm or less, and more preferably 0.4 mm or less. When weight reduction is further intended, thickness is particularly preferably 0.3 mm or less. When a roll-bonded laminate comprises 2 or more stainless steel layers, stainless steel layer thickness of the roll-bonded laminate is thickness of each stainless steel layer. Thickness of a stainless steel layer of the roll-bonded laminate can be determined in the same manner as with the case of the aluminum alloy layer. When producing a roll-bonded laminate, a stainless steel plate material is bonded at a given reduction ratio. Thus, thickness of the stainless steel layer of the roll-bonded laminate becomes smaller than that of the material before bonding.

A standard deviation of stainless steel layer thickness is preferably 2.0 μm or less, and more preferably 1.5 μm or less. A standard deviation of stainless steel layer thickness is determined by obtaining an optical microscopic photograph of a cross section of the roll-bonded laminate, measuring thickness of the stainless steel layer at 10 points at equal intervals on a cross section over a width of 300 μm in the optical microscopic photograph, and calculating the standard deviation from the values measured at the 10 points.

In the present invention, peel strength (180° peel strength, also referred to as "peel strength of 180 degrees) is used as an indicator of adhesion strength. According to the first embodiment, the peel strength of the roll-bonded laminate is 60 N/20 mm or higher. Since the roll-bonded laminate has excellent drawing workability, the peel strength is preferably 80 N/20 mm or higher, and more preferably 100 N/20 mm or higher. In the case of a roll-bonded laminate composed of 3 or more layers, the peel strength is 60 N/20 mm or higher at each bonding interface. When the peel strength is improved to a significant extent, the material would be broken instead of peeling. Thus, there is no upper limit of the peel strength.

In the present invention, the peel strength of the roll-bonded laminate is determined by preparing specimens of a width of 20 mm from the roll-bonded laminate, partly separating the stainless steel layer from the aluminum layer, fixing the thick layer side or hard layer side, and measuring the force required to pull one layer from the fixed side in the direction 180 degrees opposite therefrom. The peel strength is represented in terms of "N/20 mm." When a similar test is performed with the use of a specimen of a width of 10 mm to 30 mm, peel strength would not change.

Concerning a roll-bonded laminate composed of a stainless steel layer and an aluminum layer, when the stainless steel layer is bonded to the aluminum layer by means of surface activated bonding, the peel strength becomes low. When an annealing temperature is raised to improve the peel strength, an intermetallic compound that adversely affects the peel strength is formed on the bonding interface. To date, accordingly, it had been difficult to improve the peel strength of such roll-bonded laminate. When the aluminum layer is composed of an aluminum alloy, in particular, the aluminum layer is less likely to be deformed due to high hardness, compared with the aluminum layer composed of pure aluminum. Thus, peel strength is less likely to be enhanced at the time of bonding, and the peel strength is drastically lowered because an intermetallic compound is easily formed on the interface upon annealing.

In the present invention, the peel strength of the roll-bonded laminate can be enhanced to 60 N/20 mm or higher. Thus, the roll-bonded laminate can achieve high press workability and, in particular, high drawing workability. While the reason why the peel strength is enhanced is not apparent, the peel strength may be enhanced in the manner described below. That is, the process of roll bonding is considered to be roughly divided into two steps: the first step in which layers are brought into contact with each other; and the second step in which each outermost layer is displaced from its underlying layer after the contact, the underlying layer is exposed on the surface, and the exposed surface is brought into contact with another exposed surface. As described below, the roll-bonded laminate according to the present invention exhibits a relatively high reduction ratio at the time of bonding. In the first step, accordingly, a contact area may become larger. As described below, also, a contact surface is an oxide layer in the first step when bonding is carried out while leaving the oxide layer remained as in the case of Patent Literature 1. In the present invention, in contrast, a reduction ratio is high, the aluminum layer is deformed in accordance with the shape of the stainless steel layer, and the outermost oxide layer is displaced in the second step. As a consequence, it is highly likely that thickness of the oxide layer is reduced and the metal layer is exposed as a contact surface. In the past, diffusion from the stainless steel layer to the aluminum layer occurs in the subsequent thermal treatment, and the adhesion force was enhanced. In the present invention, however, thickness of the oxide layer is reduced or the metal layer appeared as a contact surface, as described above. Thus, diffusion is less likely to be inhibited by the oxide layer, and diffusion is more likely to be realized over a wider range or in depth. Thus, the peel strength as the adhesion force may be enhanced to a significant extent.

With the use of the roll-bonded laminate exhibiting high peel strength, one layer can fit the form of the other layer at the time of drawing work. Thus, both layers can be processed without breaking. In addition, displacement of the bonding interface can be suppressed at the time of processing, and wrinkling caused by displacement of the bonding interface can be prevented.

The roll-bonded laminate has high drawing workability, and the limiting drawing ratio thereof is preferably 1.20 or higher, more preferably 1.63 or higher, and further preferably 1.83 or higher. In the present invention, the limiting drawing ratio (D max/d) of the roll-bonded laminate is determined in the manner described below. That is, the maximal blank diameter at which a cylindrical form can be prepared via a single operation of drawing work without breaking at a drawing ratio (D/d) of the blank diameter (D) relative to the diameter (d) of the cylinder is designated as D max, and D max/d is then calculated.

The roll-bonded laminate preferably has the elongation of 35% or higher, and more preferably 40% or higher, measured by a tensile test involving the use of a test piece with a width of 15 mm from the viewpoint of satisfactory press workability. The elongation can be measured by a tensile test in accordance with the measurement of elongation at break defined by JIS Z 2241 or JIS Z 2201 with the use of, for example, the test piece for the tensile test described below.

The roll-bonded laminate preferably exhibits tensile strength of 3,000 N or higher, and more preferably 3,500 N or higher, measured by a tensile test involving the use of a test piece with a width of 15 mm from the viewpoint of sufficient strength and press workability. The term "tensile strength" used herein refers to the maximal load applied in the tensile test. The tensile strength can be measured with the use of, for example, a universal testing machine, TENSI-LON RTC-1350A (manufactured by Orientec Corporation) in accordance with JIS Z 2241 or JIS Z 2201 (the method for tensile test for metallic materials). A width of the test piece (15 mm) is the width specified for Special Test Piece No. 6 by JIS Z 2201. When measurement is carried out in accordance with JIS Z 2241, for example, Test Piece No. 5 can be used. The tensile strength determined with the use of Test Piece No. 6 may be converted into the tensile strength determined with the use of Test Piece No. 5 by multiplying a factor of the test piece width; i.e., 25 mm/15 mm, which is about 1.66 times.

The roll-bonded laminate preferably exhibits elongation of 35% or more measured by the tensile test and tensile strength of 3,000 N or higher measured by the tensile test.

II. A Method for Producing a Roll-Bonded Laminate Composed of a Stainless Steel Layer and an Aluminum Alloy Layer A roll-bonded laminate composed of a stainless steel layer and an aluminum alloy layer can be produced by a method comprising: preparing a stainless steel plate and an aluminum alloy plate and subjecting the surface of the stainless steel plate and the surface of the aluminum alloy plate to be bonded to each other to sputter etching; pressure bonding the surfaces subjected to sputter etching to each other at a reduction ratio of the aluminum alloy layer of 5% or higher and a reduction ratio of the roll-bonded laminate of 15% or lower; and performing batch annealing at 200° C. to 370° C. or continuous annealing at 300° C. to 800° C. According to the method of production, the number of layers of the final form of the roll-bonded laminate can be changed in accordance with the number of repetitions of the sputter etching and the bonding. In the case of a bi-layer roll-bonded laminate, for example, the sputter etching can be performed in combination with the bonding, followed by annealing. In the case of a tri-layer roll-bonded laminate, the sputter etching can be performed in combination with the bonding, and they can be repeated in combination, followed by annealing. Thus, the roll-bonded laminate of interest can be produced.

A stainless steel plate that can be used is the stainless steel plate described with regard to the roll-bonded laminate above. From the viewpoint of drawing workability, an annealed material (O material) or ½H material is preferable.

In general, the stainless steel plate with thickness of at least 0.011 mm before bonding is applicable. From the viewpoint of drawing workability, strength, and ease of handling of the roll-bonded laminate, the lower limit is preferably 0.05 mm or more, and more preferably 0.1 mm or more. When the thickness of the stainless steel layer of the roll-bonded laminate is excessively smaller than that of the aluminum layer, in particular, the stainless steel layer cannot fit the aluminum layer at the time of drawing work, and the laminate becomes easy to break. While the upper limit of the thickness is not particularly limited, elongation and drawing workability of the roll-bonded laminate may be deteriorated when the stainless steel layer is too thick relative to the aluminum layer. Thus, the thickness is preferably 0.55 mm or less, and more preferably 0.44 mm or less. When weight reduction is further intended, the thickness of 0.33 mm or less is particularly preferable. Thickness of the stainless steel plate before bonding can be measured with the use of, for example, a micrometer, and such thickness is determined by measuring thickness at randomly selected 10 points on the stainless steel plate surface and calculating the average.

An aluminum alloy plate that can be used is the aluminum alloy plate described with reference to the roll-bonded laminate above.

In general, the aluminum alloy plate with thickness of at least 0.011 mm before bonding is applicable. The lower limit is preferably 0.11 mm or more, more preferably 0.55 mm or more, and particularly preferably 0.66 mm or more. As the thickness of the aluminum alloy layer is increased, drawing workability is likely to be high. When an excessively thick aluminum alloy layer is used for applications involving drawing work or bending work, a curvature thereof is increased. Thus, the stainless steel layer may be extended and broken therefrom. From the viewpoint of weight reduction and cost, thickness is generally 3.3 mm or less, preferably 2.7 mm or less, more preferably 1.8 mm or less, further preferably 1.2 mm or less, and particularly preferably 0.82 mm or less. Compared with pure aluminum, an aluminum alloy has higher strength. Thus, advantageously, thickness thereof can be easily reduced. Thickness of the aluminum alloy plate before bonding can be determined in the same manner as with the case of the stainless steel plate.

At the time of sputter etching, the surface of the stainless steel plate and the surface of the aluminum alloy plate to be bonded to each other are subjected to sputter etching.

Specifically, sputter etching is carried out by preparing a stainless steel plate and an aluminum alloy plate as a long coil with a width of 100 mm to 600 mm, designating the stainless steel plate connected to the aluminum alloy plate as a ground-connected electrode, applying an alternating current of 1 MHz to 50 MHz to a region between the ground-connected electrode and the other insulated electrode to generate a glow discharge, and adjusting an area of the electrode exposed to the plasma generated by the glow discharge to one third or less of the area of the other electrode. During sputter-etching, the ground-connected electrode is in the form of a cooling roll, which prevents the transfer materials from temperature increase.

Sputter-etching treatment is intended to completely remove substances adsorbed to the surfaces and remove a part of or the entire oxide film on the surfaces by subjecting the surfaces of the stainless steel plate and the aluminum alloy plate to be bonded to sputtering with inert gas in vacuum. It is not necessary to completely remove the oxide film, and the stainless steel layer can be sufficiently bonded to the aluminum alloy plate in the presence of a remaining part of the oxide film. In the presence of a remaining part of the oxide film, the duration of the sputter-etching treatment is shortened to a significant extent, and productivity of metal laminate materials is improved, compared to the case in which the oxide film is completely removed. Examples of inert gas that can be applied include argon, neon, xenon, krypton, and a mixed gas comprising at least one of the inert gases mentioned above. Substances adsorbed to the surface of the stainless steel plate or the aluminum alloy plate can be completely removed with the etching amount of about 1 nm.

In the case of a single plate, for example, the stainless steel plate can be subjected to sputter-etching in vacuum at a plasma output of 100 W to 1 kW for 1 to 50 minutes. In the case of a long material such as a line material, for example, it can be subjected to sputter-etching in vacuum at a plasma output of 100 W to 10 kW and a line velocity of 1 m/min to 30 m/min. While a higher degree of vacuum is preferable in order to prevent substances from being readsorbed to the surface, a degree of vacuum of, for example, $1\times10^{-5}$ Pa to 10 Pa is sufficient. In sputter-etching, temperature of the stainless steel plate is preferably maintained at ordinary temperature to 150° C., so as to prevent the aluminum alloy plate from softening.

A stainless steel plate comprising an oxide film remaining in a part on its surface can be obtained by adjusting the etching amount of the stainless steel plate to, for example, 1 nm to 10 nm. According to need, the amount of etching may exceed 10 nm.

In the case of a single plate, for example, the aluminum alloy plate can be subjected to sputter-etching in vacuum at a plasma output of 100 W to 1 kW for 1 to 50 minutes. In the case of a long material such as a line material, for example, it can be subjected to sputter-etching at a plasma output of 100 W to 10 kW and a line velocity of 1 m/min to 30 m/min. While a higher degree of vacuum is preferable in order to prevent substances from being readsorbed to the surface, a degree of vacuum of $1\times10^{-5}$ Pa to 10 Pa is sufficient.

An aluminum alloy plate comprising an oxide film remaining in a part on its surface can be obtained by adjusting the etching amount of the aluminum alloy plate to, for example, 1 nm to 10 nm. According to need, the amount of etching may exceed 10 nm.

The surface of the stainless steel plate and the surface of the aluminum alloy plate subjected to sputter etching are pressure-bonded, for example roll-bonded to each other at a reduction ratio of the aluminum alloy layer of 5% or higher and a reduction ratio of the roll-bonded laminate of 15% or lower. Thus, the stainless steel plate is bonded to the aluminum alloy plate.

A reduction ratio of the aluminum alloy layer is determined based on thickness of the aluminum alloy plate before bonding and thickness of the aluminum alloy layer of the final form of the roll-bonded laminate. Specifically, the reduction ratio of the aluminum alloy layer is determined by the formula: (thickness of the aluminum alloy plate material before bonding−thickness of the aluminum alloy layer of the final form of the roll-bonded laminate)/thickness of the aluminum alloy plate material before bonding.

In the method of production according to the present invention, a reduction ratio of the aluminum alloy layer is 5% or higher, preferably 6% or higher, and more preferably 8% or higher. If a reduction ratio of the aluminum alloy layer is 5% or higher, the peel strength of the roll-bonded laminate can be enhanced to 60 N/20 mm or higher. As a result, drawing workability is improved, and a range of an improvement in the peel strength before annealing to that after annealing is enhanced to a significant extent, compared with the case in which a reduction ratio of the aluminum alloy layer is lower than 5%. While the reason why the peel strength is enhanced is not apparent, the peel strength may be enhanced in the manner described below. That is, the process of roll bonding is considered to be roughly divided into two steps: the first step in which layers are brought into contact with each other; and the second step in which each outermost layer is displaced from its underlying layer after the contact, the underlying layer is exposed on the surface, and the exposed surface is brought into contact with another exposed surface. As described below, the roll-bonded laminate according to the present invention exhibits a relatively high reduction ratio at the time of bonding. In the first step, accordingly, a contact area may become larger. As described below, also, a contact surface is an oxide layer in the first step when bonding is carried out while leaving the oxide layer remained as in the case of Patent Literature 1. In the present invention, in contrast, a reduction ratio is high, the aluminum layer is deformed in accordance with the shape of the stainless steel layer, and the outermost oxide layer is displaced in the second step. As a consequence, thickness of the oxide layer is more likely to be reduced, and a metal layer is more likely to appear as a contact surface. In the past, also, the adhesion force was enhanced as diffusion from the stainless steel layer to the aluminum layer occurs in the subsequent thermal treatment. In the present invention, however, thickness of the oxide layer is reduced or the metal layer is exposed as a contact surface, as described above. Thus, diffusion is less likely to be inhibited by the oxide layer, diffusion is more likely to be realized over a wider range or in depth, and the peel strength indicating the adhesion force is enhanced to a significant extent. As a result, drawing workability of the final form of the roll-bonded laminate would be improved.

The upper limit of the reduction ratio of the aluminum alloy layer is not particularly limited. For example, the upper limit is 18% or lower, and it is more preferably 15% or lower. When the reduction ratio of the aluminum alloy layer is lower than such upper limit, the peel strength can be enhanced after thermal treatment, aluminum alloy layer thickness can be maintained flat, and improved drawing workability can be stably maintained.

A reduction ratio of the stainless steel layer is preferably 0.5% or higher, more preferably 2% or higher, and further preferably 3% or higher. When the reduction ratio of the stainless steel layer is 0.5% or higher, the peel strength of the final form of the roll-bonded laminate is likely to be enhanced to 60 N/20 mm or higher, and drawing workability can be improved as a consequence. When the stainless steel layer is bonded to the aluminum alloy layer, however, the aluminum alloy layer is more likely to be deformed, and the reduction ratio of the stainless steel layer becomes lower than the reduction ratio of the aluminum alloy layer. When the reduction ratio of the stainless steel layer is increased, work hardening is likely to occur. Accordingly, the reduction ratio is preferably 10% or lower, and more preferably 8% or lower. When the reduction ratio of the stainless steel layer is lower than the level mentioned above, work hardening caused by straining can be suppressed. Accordingly, deterioration in elongation and press workability can be suppressed. As described below, effects of softening by thermal treatment after roll bonding are insignificant for the stainless steel layer. Thus, it is necessary to adjust the reduction ratio at the time of roll bonding to regulate the influence of work hardening.

Accordingly, the reduction ratio of the stainless steel layer is preferably 0.5% to 10%, so as to achieve the effects of improved peel strength, the effects of improved drawing workability accompanied thereby, and the effects of suppressing deterioration in press workability caused by work hardening.

The reduction ratio of the roll-bonded laminate is 15% or lower, preferably 14% or lower, and more preferably 13% or lower. When the reduction ratio of the roll-bonded laminate is 15% or lower, the stainless steel layer would not be excessively hard, and sufficient strength and elongation can be achieved. Accordingly, the roll-bonded laminate has high press workability. In addition, thickness of each layer can be maintained relatively even, and high press workability can be thus achieved. When a thin layer is generated at the time of roll bonding, specifically, a load is likely to be applied locally at the time of press working, and the laminate may become easy to break. While the lower limit is not particularly limited, the lower limit is preferably 4% or higher, more preferably 5% or higher, further preferably 6% or higher, and particularly preferably 7.5% or higher, on the basis of the reduction ratio of the aluminum alloy layer to achieve the effects of improved peel strength. The reduction ratio of the roll-bonded laminate is determined based on the total thickness of the stainless steel plate material and the aluminum alloy plate material before bonding and the thickness of the final form of the roll-bonded laminate. Specifically, the reduction ratio of the roll-bonded laminate is determined by the formula: (the total thickness of the stainless steel plate material and the aluminum alloy plate material before bonding–the thickness of the final form of the roll-bonded laminate)/the total thickness of the stainless steel plate material and the aluminum alloy plate material before bonding.

A line pressure load for rolling bonding is not particularly limited. It may be determined to achieve a given reduction ratio of the aluminum alloy layer and that of the roll-bonded laminate. For example, a line pressure load can be adjusted within a range of 1.6 tf/cm to 10.0 tf/cm. When a diameter of a pressure roll is 100 mm to 250 mm, for example, a line pressure load for rolling bonding is preferably 1.9 tf/cm to 4.0 tf/cm, and more preferably 2.3 tf/cm to 3.0 tf/cm. When a roll diameter is increased or the stainless steel plate and the aluminum alloy plate are thick before bonding, however, it is occasionally necessary to increase a line pressure load to maintain a pressure that is necessary to achieve a given reduction ratio, and the line pressure load is not limited thereto.

At the time of bonding, temperature is not particularly limited. For example, bonding is carried out at ordinary temperature to 150° C.

Bonding is preferably carried out in the non-oxidizing atmosphere, such as in an inert gas atmosphere (e.g., Ar), so as to prevent oxygen from being readsorbed onto the surface of the stainless steel plate and that of the aluminum alloy plate and to prevent the bonding strength therebetween from lowering.

The roll-bonded laminate obtained by bonding the stainless steel plate to the aluminum alloy plate in the manner described above is subjected to thermal treatment. Thus, adhesion between layers can be improved, and effects of improving the adhesion force can further be enhanced by conducting thermal treatment in conjunction with adjustment of the reduction ratio of the aluminum alloy layer as described above. In addition, such thermal treatment can also serve as annealing of the roll-bonded laminate, in particular, the aluminum alloy layer. Thus, such thermal treatment is also referred to as "annealing" hereinafter.

In the case of batch annealing, for example, annealing temperature is 200° C. to 370° C., and preferably 250° C. to 345° C. In the case of continuous annealing, for example, it is 300° C. to 800° C., and preferably 350° C. to 550° C. By adjusting the annealing temperature within such range, the peel strength of the roll-bonded laminate is enhanced to 60 N/20 mm or higher, and drawing workability is improved as a consequence. Such annealing temperature is within a nonrecrystallized temperature range for stainless steel. That is, stainless steel is not substantially softened at such temperature. In the case of aluminum alloy, work strain is eliminated, and aluminum alloy is softened. In the present invention, the reduction ratio of the aluminum alloy layer and the reduction ratio of the roll-bonded laminate at the time of bonding, and the annealing temperature are adjusted within predetermined ranges. Thus, the peel strength of the roll-bonded laminate is improved to a significant extent. As a result, drawing workability is improved. The term "annealing temperature" refers to a temperature of the roll-bonded laminate to be subjected to annealing.

Through the thermal treatment, at least, metal elements contained in stainless steel (e.g., Fe, Cr, and Ni) are thermally diffused in the aluminum alloy layer. Alternatively, metal elements contained in stainless steel and aluminum may be thermally diffused alternately. While the peel strength of the roll-bonded laminate of stainless steel and aluminum is known to be improved via such thermal diffusion, as described above, the present inventors discovered that effects of improvement can vary as a result of thermal diffusion in combination with adjustment of the reduction ratio at the time of roll bonding. The peel strength can be improved in the manner described below. In the present application, as described above, thickness of an oxide at the interface between the stainless steel alloy layer and the aluminum alloy layer is reduced or a metal layer is exposed on the bonding interface. Thus, diffusion is less likely to be inhibited by an oxide layer, diffusion proceeds in a wide area of the bonding interface or into the depth from the interface, and the peel strength is improved to a significant extent. Accordingly, the present invention can provide a roll-bonded laminate exhibiting the peel strength of 60 N/20 mm or higher; that is, a roll-bonded laminate that is excellent in press workability.

A duration of annealing can be adequately determined in accordance with an annealing method (batch or continuous annealing), annealing temperature, or a size of a roll-bonded laminate subjected to annealing. In the case of batch annealing, for example, temperature of the roll-bonded laminate is raised to a given level, and the roll-bonded laminate is then held at that temperature for 0.5 to 10 hours, and preferably for 2 to 8 hours. If an intermetallic compound is not generated, batch annealing may be carried out for 10 hours or longer. In the case of continuous annealing, temperature of the roll-bonded laminate is raised to a given level, and the roll-bonded laminate is then held at that temperature for 20 seconds to 5 minutes. The term "duration of annealing" refers to a duration after the temperature of the roll-bonded laminate to be subjected to annealing is raised to a given level, and such duration does not include a period during which temperature of the roll-bonded laminate is raised. A duration of annealing may be approximately 1 to 2 hours when a material is as small as the A4 paper size in the case of batch annealing. In the case of a large material, such as a long coil material with a width of 100 mm or larger and a length of 10 m or longer, batch annealing needs to be carried out for approximately 2 to 8 hours.

In the method of production according to the present invention, a roll-bonded laminate comprising an aluminum alloy layer with a thickness larger than the thickness of interest may be first prepared, the aluminum alloy layer of the roll-bonded laminate may be grounded to reduce a thickness, and the laminate with a targeted thickness may then be prepared. By grinding the aluminum alloy layer, the outermost surface of the aluminum alloy layer can be hardened. Alternatively, the roll-bonded laminate obtained as a result of bonding and thermal treatment may be subjected to configurational modification with the use of a tension leveler, so as to achieve an elongation of approximately 1% to 2%. Thus, a thickness can be reduced by approximately 1% to 2%, the aluminum alloy layer can be hardened, and hardness can be improved. Such means may be employed in adequate combination. For example, configurational modification may be carried out with the use of a tension leveler, and the aluminum alloy layer may then be grounded.

In order to enhance the hardness of the stainless steel layer of the roll-bonded laminate, for example, hard raw materials may be prepared (hardness codes of H, ¾H, ½H, and BA in descending order of hardness), and these materials may be bonded to prepare a roll-bonded laminate. It should be noted that processing becomes difficult if a stainless steel layer is excessively hard. Alternatively, a load may be increased at the time of bonding, so as to enhance the hardness of the stainless steel layer of the roll-bonded laminate after bonding. For example, the layers may be bonded to each other so as to adjust the reduction ratio of the stainless steel layer to 0.5% to 10%. Thus, hardness of the stainless steel layer is increased from approximately 200 (Hv) to 270 (Hv).

Concerning the roll-bonded laminate produced in the manner described above, a framework may be formed via deep drawing using a press, and the exterior including the back surface may be subjected to surface treatment, such as grinding, chemical conversion, or coating. According to need, an inner surface may be cut or grounded to create concaves and convexes that are primarily necessary for incorporation of internal components. According to need, insert molding may be carried out with resin to form a metal-resin complex on inner and outer surfaces. In accordance with the method described above, the laminate can be processed into a housing, although the method is not limited thereto.

III. A Roll-Bonded Laminate Composed of a Stainless Steel Layer and a Pure Aluminum Layer According to the second embodiment of the present invention, the roll-bonded laminate consists of a stainless steel layer and a pure aluminum layer.

As pure aluminum used for a pure aluminum layer, a pure aluminum plate in which the total content of additive metal elements other than aluminum is 1% by mass or less can be used. An example of pure aluminum that can be used is 1000 series pure aluminum specified by JIS. The total content of additive metal elements other than aluminum in pure aluminum is preferably 0.5% by mass or less, more preferably 0.3% by mass or less, and particularly preferably 0.15% by mass or less.

Stainless steel used for the stainless steel layer is the same as with the case of the roll-bonded laminate according to the first embodiment described above.

Thickness of the roll-bonded laminate is not particularly limited. It is generally 0.045 mm to 3.0 mm, the upper limit is preferably 2.0 mm or less, and more preferably 1.7 mm or less, and the lower limit is preferably 0.1 mm or more, and more preferably 0.7 mm or more.

In general, a pure aluminum layer with thickness of 0.01 mm or more is applicable. From the viewpoint of workability and ease of handling of the roll-bonded laminate, thickness is preferably 0.1 mm or more. When further strength is intended, thickness is more preferably 0.5 mm or more, and particularly preferably 0.7 mm or more. From the viewpoint of weight reduction and cost, thickness is preferably 3.0 mm or less, more preferably 2.00 mm or less, and further preferably 1.7 mm or less. It is preferable that thickness of the pure aluminum layer is larger than that of the stainless steel layer.

In general, a stainless steel layer with thickness of 0.01 mm or more is applicable. From the viewpoint of drawing workability and strength, the lower limit is preferably 0.045 mm or more, and more preferably 0.1 mm or more. While the upper limit is not particularly limited, elongation and drawing workability may be deteriorated when a stainless steel layer is excessively thick relative to the aluminum layer. Thus, the upper limit is preferably 0.5 mm or less, and more preferably 0.4 mm or less. When weight reduction is further intended, thickness of 0.3 mm or less is particularly preferable.

A standard deviation of stainless steel layer thickness is preferably 2.0 μm or less, and more preferably 1.5 μm or less.

The roll-bonded laminate according to the second embodiment has peel strength (180° peel strength) of 160 N/20 mm or higher, that is, the roll-bonded laminate has excellent drawing workability. To this end, peel strength is preferably 180 N/20 mm or higher, and more preferably 200 N/20 mm or higher. In the case of a roll-bonded laminate composed of 3 or more layers, peel strength is 160 N/20 mm or higher at each bonding interface. When the peel strength of the roll-bonded laminate is 160 N/20 mm or higher, the roll-bonded laminate has very high drawing workability.

The limiting drawing ratio of the roll-bonded laminate is preferably 1.63 or more, and more preferably 1.83 or more.

The roll-bonded laminate preferably exhibits elongation of 40% or higher measured by a tensile test. From the viewpoint of press workability, elongation is more preferably 50% or higher.

The roll-bonded laminate preferably exhibits tensile strength of 2,500 N or higher measured by a tensile test. From the viewpoint of sufficient strength and workability, tensile strength is more preferably 3,000 N or higher.

In the second embodiment, the method of measuring layer thickness, the method of measuring peel strength of the roll-bonded laminate, the method of determining the limiting drawing ratio, and the method of measuring elongation and tensile strength by a tensile test are the same as those employed in the first embodiment.

IV. A Method for Producing a Roll-Bonded Laminate Composed of a Stainless Steel Layer and a Pure Aluminum Layer A roll-bonded laminate composed of a stainless steel layer and a pure aluminum layer can be produced in the same manner as with the case of the roll-bonded laminate according to the first embodiment, except that the reduction ratio of the pure aluminum layer and the reduction ratio of the roll-bonded laminate employed in the step of bonding and the annealing temperature employed in the step of annealing are changed to given levels.

Specifically, a roll-bonded laminate composed of a stainless steel layer and a pure aluminum layer can be produced by a method comprising: preparing a stainless steel plate and a pure aluminum plate and subjecting the surface of the stainless steel plate and the surface of the pure aluminum plate to be bonded to each other to sputter etching; pressure bonding, for example roll bonding the surfaces subjected to sputter etching to each other at a reduction ratio of the pure aluminum layer of 10% or higher and a reduction ratio of the roll-bonded laminate of 20% or lower, and performing batch annealing at 200° C. to 500° C. or continuous annealing at 300° C. to 800° C.

In roll bonding, a reduction ratio of the pure aluminum layer is 10% or higher, and preferably 12% or higher. By adjusting the reduction ratio of the pure aluminum layer to 10% or higher, the peel strength of the roll-bonded laminate can be enhanced to 160 N/20 mm or higher. Thus, drawing workability can be enhanced, and a range of an improvement in the peel strength before annealing to that after annealing is enhanced to a significant extent, compared with the case in which a reduction ratio of the pure aluminum layer is lower than 10% (e.g., a reduction ratio of approximately 1% to 5% in the examples of Patent Literature 1).

The upper limit of the reduction ratio of the pure aluminum layer is not particularly limited. For example, it is 20% or lower, and more preferably 18% or lower. In order to suppress deformation of the pure aluminum layer and maintain thickness accuracy, the reduction ratio is particularly preferably lower than 15%. When the reduction ratio of the pure aluminum layer is lower than such upper limit, the peel strength can be enhanced after thermal treatment, pure aluminum layer thickness can be maintained flat, and improved drawing workability can be stably maintained.

A reduction ratio of the stainless steel layer is preferably 0.5% or higher, more preferably 2% or higher, and further preferably 3% or higher. When the reduction ratio of the stainless steel layer is 0.5% or higher, the peel strength of the resulting roll-bonded laminate is likely to be enhanced to 160 N/20 mm or higher, and drawing workability can be improved as a consequence. When the stainless steel layer is bonded to the pure aluminum layer, however, the pure aluminum layer is more likely to be deformed, and the reduction ratio of the stainless steel layer becomes lower than the reduction ratio of the pure aluminum layer. When the reduction ratio of the stainless steel layer is increased, work hardening is likely to occur. Accordingly, the reduction ratio is preferably 10% or lower, and more preferably 8% or lower. When the reduction ratio of the stainless steel layer is lower than the level mentioned above, work hardening caused by straining can be suppressed. Accordingly, deterioration in elongation and press workability can be suppressed. As described below, effects of softening by thermal treatment after roll bonding are insignificant for the stainless steel layer. Thus, it is necessary to adjust the reduction ratio at the time of roll bonding to regulate the influence of work hardening.

Accordingly, the reduction ratio of the stainless steel layer is preferably 0.5% to 10%, so as to achieve the effects of improved peel strength, the effects of improved drawing workability accompanied thereby, and the effects of suppressing deterioration in press workability caused by work hardening.

The reduction ratio of the roll-bonded laminate is 20% or lower, and preferably 18% or lower. When the reduction ratio of the roll-bonded laminate is 20% or lower, the stainless steel layer would not be excessively hard, and sufficient strength and elongation can be achieved. Accordingly, the roll-bonded laminate has high press workability. In addition, thickness of each layer can be maintained relatively even, and high press workability can be thus achieved. When a thin layer is generated at the time of roll bonding, specifically, a load is likely to be applied locally at the time of press working, and the laminate may become easy to break. While the lower limit is not particularly limited, the lower limit is preferably 9% or more, and more preferably 11% or more, on the basis of the reduction ratio of the aluminum alloy layer to achieve the effects of improved peel strength.

A line pressure load for rolling bonding is not particularly limited. It may be determined to achieve a given reduction ratio of the pure aluminum layer and that of the roll-bonded laminate. For example, a line pressure load can be adjusted within a range of 1.6 tf/cm to 10.0 tf/cm. When a diameter of a pressure roll is 100 mm to 250 mm, for example, a line pressure load for rolling bonding is preferably 1.6 tf/cm to 3.0 tf/cm, and more preferably 1.8 tf/cm to 2.5 tf/cm. When a roll diameter is increased or the metal layers are thick before bonding, however, it is occasionally necessary to increase a line pressure load to maintain a pressure that is necessary at the time of bonding, and the line pressure load is not limited to the level mentioned above. When a line load is also 2.0 tf, for example, a size of contact area when the roll diameter is approximately 2 to 3 times larger than 100 mm to 250 is different by approximately 2 to 5 times from the size of contact area when the roll diameter is 100 mm to 250, therefore, the rolling force applied per area decreases and the reduction ratio decreases. Further, the contact area and rolling force also change by a material width and influence of tensile strength and the like in case of line production. In the present invention, a reduction ratio is adjusted within a given range, so that the effects of interest can be attained.

In the step of annealing, batch annealing is carried out at 200° C. to 500° C., and continuous annealing is carried out at 300° C. to 800° C. By adjusting the annealing temperature within such range, high peel strength and high tensile strength can be both achieved. According to this embodiment, annealing temperature is preferably 300° C. or higher, and more preferably 350° C. or higher, when enhanced peel strength of the roll-bonded laminate is intended. When enhanced high peel strength and enhanced high tensile strength are both intended, annealing temperature is preferably 200° C. to 300° C.

In the method for producing the roll-bonded laminate according to the second embodiment, grinding of the pure aluminum layer, configurational modification with the use of a tension leveler, adjustment of hardness of the stainless steel layer, and processing of a housing can be carried out in the same manner as with the case of the method for producing the roll-bonded laminate according to the first embodiment.

V. A Roll-Bonded Laminate Composed of a Pure Titanium or Titanium Alloy Layer and an Aluminum Alloy Layer According to the third embodiment of the present invention, the roll-bonded laminate is composed of a pure titanium or titanium alloy layer and an aluminum alloy layer. This roll-bonded laminate is composed of two or more layers, preferably 2 to 4 layers, and more preferably 2 or 3 layers. In the present invention, an adequate constitution of the roll-bonded laminate can be selected in accordance with applications or desired properties of the roll-bonded laminate. A roll-bonded laminate composed of a pure titanium layer and an aluminum alloy layer is preferable.

As an aluminum alloy used for an aluminum alloy layer, an aluminum alloy plate in which the total content of the additive metal elements (i.e., at least one additive metal element selected from Mg, Mn, Si, and Cu as a metal element other than aluminum) exceeds 1% by mass can be used.

For example, aluminum alloys defined by JIS, such as Al—Cu-base alloy (2000 series), Al—Mn-base alloy (3000 series), Al—Si-base alloy (4000 series), Al—Mg-base alloy (5000 series), Al—Mg—Si-base alloy (6000 series), and Al—Zn—Mg-base alloy (7000 series), can be used. From the viewpoint of press workability, strength, and corrosion resistance, aluminum alloys of 3000 series, 5000 series, 6000 series, and 7000 series are preferable. From the viewpoint of the balance between such properties and cost, an aluminum alloy of 5000 series is more preferable. An aluminum alloy preferably contains Mg in an amount of 0.3% by mass or more.

As pure titanium used for a pure titanium layer, a pure titanium plate in which the total content of additive metal elements other than titanium is 1% by mass or less can be used. The total content of additive metal elements other than titanium in the pure titanium is preferably 0.5% by mass or less, more preferably 0.3% by mass or less, and particularly preferably 0.15% by mass or less. Examples of pure titanium that can be used include 1 to 4 types of pure titanium products specified by JIS H 4600, with a type 1 pure titanium (TP270) being preferable.

As a titanium alloy used for a titanium alloy layer, a titanium alloy plate in which the total content of the additive metal elements (i.e., at least one additive metal element selected from V, Cr, Sn, Al, Mo, Zr, and Pd as a metal element other than titanium) exceeds 1% by mass can be used. Examples of titanium alloys that can be used include α type, β type, and α+β type titanium alloys. From the viewpoint of workability, β type and α+β type titanium alloys are preferable.

Thickness of the roll-bonded laminate is not particularly limited. It is generally 0.045 mm to 3.0 mm, the upper limit is preferably 2.0 mm or less, and more preferably 1.7 mm or less, and the lower limit is preferably 0.1 mm or more, and more preferably 0.5 mm or more.

In general, an aluminum alloy layer with thickness of 0.01 mm or more is applicable. From the viewpoint of workability and ease of handling of the roll-bonded laminate, the lower limit of thickness is preferably 0.1 mm or more. When further strength is intended, thickness is more preferably 0.3 mm or more, and particularly preferably 0.5 mm or more. From the viewpoint of weight reduction and cost, thickness is preferably 3.0 mm or less, more preferably 2.0 mm or less, and further preferably 1.7 mm or less. It is preferable that thickness of the aluminum alloy layer be larger than that of the pure titanium layer or the titanium alloy layer.

In general, a pure titanium layer or a titanium alloy layer with thickness of 0.01 mm or more is applicable. From the viewpoint of strength, the lower limit is preferably 0.045 mm or more, and more preferably 0.1 mm or more. While the upper limit is not particularly limited, elongation may be deteriorated when a pure titanium layer or a titanium alloy layer is excessively thick relative to the aluminum layer. Thus, the upper limit is preferably 0.5 mm or less, and more preferably 0.4 mm or less. When weight reduction is further intended, thickness of 0.3 mm or less is particularly preferable.

The roll-bonded laminate according to the third embodiment has peel strength (180° peel strength) of 40 N/20 mm or higher, preferably 50 N/20 mm or higher, and more preferably 60 N/20 mm or higher. When the peel strength of the roll-bonded laminate composed of a pure titanium or titanium alloy layer and an aluminum alloy layer is 40 N/20 mm or higher, the adhesion force between the pure titanium or titanium alloy layer and the aluminum alloy layer is very high. This improves performance and ease of handling at the time of production. In particular, ease of handling of a long material at the time of production is improved. In the case of a roll-bonded laminate composed of 3 or more layers, peel strength is 40 N/20 mm or higher at each bonding interface.

Concerning a roll-bonded laminate composed of a pure titanium or titanium alloy layer and an aluminum layer, a pure titanium or titanium alloy layer is bonded to an aluminum layer via surface activation bonding. In such a case, peel strength is low. When an annealing temperature is raised to enhance peel strength, an intermetallic compound that would adversely affect peel strength is generated on the bonding surface. Thus, it was difficult to improve peel strength of such roll-bonded laminate. When an aluminum layer is made of an aluminum alloy, in particular, the layer is less likely to be deformed because of high hardness. Accordingly, the peel strength is less likely to be enhanced at the time of bonding. In addition, an intermetallic compound is likely to be generated at the interface as a result of annealing. Thus, peel strength is deteriorated to a significant extent.

According to the present invention, the peel strength of the roll-bonded laminate can be enhanced to 40 N/20 mm or higher. It is considered that the peel strength of the roll-bonded laminate composed of the pure titanium or titanium alloy layer and the aluminum alloy layer is enhanced in accordance with the similar mechanism as in the case of the roll-bonded laminate composed of the stainless steel layer and the aluminum alloy layer according to the first embodiment. Because of a relatively high reduction ratio at the time of bonding, the peel strength can be enhanced to a significant extent by thermal treatment.

The roll-bonded laminate preferably exhibits elongation of 20% or higher measured by a tensile test, and it more preferably exhibits elongation of 25% or higher from the viewpoint of workability.

The roll-bonded laminate preferably exhibits tensile strength of 2500 N or higher measured by a tensile test. From the viewpoint of strength, tensile strength is more preferably 2600 N or higher.

In the third embodiment, the method of measuring layer thickness, the method of measuring peel strength of the roll-bonded laminate, and the method of measuring elongation and tensile strength by a tensile test are the same as those employed in the first and the second embodiments.

VI. A Method for Producing a Roll-Bonded Laminate Composed of a Pure Titanium or Titanium Alloy Layer and an Aluminum Alloy Layer A roll-bonded laminate composed of a pure titanium or titanium alloy layer and an aluminum alloy layer can be produced by a method comprising: preparing a pure titanium or titanium alloy plate and an aluminum alloy plate and subjecting the surface of the pure titanium or titanium alloy plate and the surface of the aluminum alloy plate to be bonded to each other to sputter etching; pressure bonding, for example roll bonding the surfaces subjected to sputter etching to each other at a reduction ratio of the aluminum alloy layer of 7% or higher and a reduction ratio of the roll-bonded laminate of 20% or lower; and performing batch annealing at 200° C. to 500° C. or continuous annealing at 300° C. to 800° C.

A pure titanium or titanium alloy plate that can be used is the pure titanium or titanium alloy plate described with regard to the roll-bonded laminate.

In general, the pure titanium or titanium alloy plate with thickness of at least 0.01 mm before bonding is applicable. From the viewpoint of drawing workability and strength, the lower limit is preferably 0.05 mm or more, and more preferably 0.1 mm or more. While the upper limit is not particularly limited, elongation may be deteriorated when a pure titanium layer or a titanium alloy layer is excessively thick relative to the aluminum layer. Thus, the upper limit is preferably 0.55 mm or less, and more preferably 0.44 mm or less. When weight reduction is further intended, thickness of 0.33 mm or less is particularly preferable.

An aluminum alloy plate that can be used is the aluminum alloy plate described with regard to the roll-bonded laminate.

In general, the aluminum alloy plate with thickness of at least 0.01 mm before bonding is applicable. From the viewpoint of workability and ease of handling of the roll-bonded laminate, the lower limit is preferably 0.1 mm or more. When further strength is intended, thickness is more preferably 0.3 mm or more, and particularly preferably 0.5 mm or more. From the viewpoint of weight reduction and cost, thickness is preferably 3.0 mm or less, more preferably 2.0 mm or less, and further preferably 1.7 mm or less.

At the time of sputter etching, the surface of the pure titanium or titanium alloy plate and the surface of the aluminum alloy plate to be bonded to each other are subjected to sputter etching.

Specifically, sputter etching is carried out by preparing the pure titanium or titanium alloy plate and the aluminum alloy plate as a long coil with a width of 100 mm to 600 mm, designating the pure titanium or titanium alloy plate connected to the aluminum alloy plate as a ground-connected electrode, applying an alternating current of 1 MHz to 50 MHz to a region between the electrode and the other insulated electrode to generate a glow discharge, and adjusting an area of the electrode exposed to the plasma generated by the glow discharge to one third or less of the area of the other electrode. During sputter-etching, the ground-connected electrode is in the form of a cooling roll, which prevents the transfer materials from temperature increase.

Sputter-etching treatment is intended to completely remove substances adsorbed to the surfaces and remove a part of or the entire oxide film on the surfaces by subjecting the surfaces of the pure titanium or titanium alloy plate and the aluminum alloy plate to be bonded to sputtering with inert gas in vacuum. It is not necessary to completely remove the oxide film, and the pure titanium or titanium alloy plate can be sufficiently bonded to the aluminum alloy plate in the presence of a remaining part of the oxide film. In the presence of a remaining part of the oxide film, the duration of the sputter-etching treatment is shortened to a significant extent, and productivity of metal laminate materials is improved, compared to the case in which the oxide film is completely removed. Examples of inert gas that can be applied include argon, neon, xenon, krypton, and a mixed gas comprising at least one of the inert gases mentioned above. Substances adsorbed to the surface of the pure titanium or titanium alloy plate or the aluminum alloy plate can be completely removed with the etching amount of about 1 nm.

In the case of a single plate, for example, the pure titanium or titanium alloy plate can be subjected to sputter-etching in vacuum at a plasma output of 100 W to 1 kW for 1 to 50 minutes. In the case of a long material such as a line material, for example, it can be subjected to sputter-etching in vacuum at a plasma output of 100 W to 10 kW and a line velocity of 1 m/min to 30 m/min. While a higher degree of vacuum is preferable in order to prevent substances from being readsorbed to the surface, a degree of vacuum of, for example, $1 \times 10^{-5}$ Pa to 10 Pa is sufficient. In sputter-etching, the temperature of the pure titanium or titanium alloy plate is preferably maintained at ordinary temperature to 150° C., so as to prevent the aluminum alloy plate from softening.

A pure titanium or titanium alloy plate comprising an oxide film remaining in a part on its surface can be obtained by adjusting the etching amount of the pure titanium or titanium alloy plate to, for example, 1 nm to 10 nm. According to need, the amount of etching may exceed 10 nm.

In the case of a single plate, for example, the aluminum alloy plate can be subjected to sputter-etching in vacuum at a plasma output of 100 W to 1 kW for 1 to 50 minutes. In the case of a long material such as a line material, for example, it can be subjected to sputter-etching at a plasma output of 100 W to 10 kW and a line velocity of 1 m/min to 30 m/min. While a higher degree of vacuum is preferable in order to prevent substances from being readsorbed to the surface, a degree of vacuum of $1 \times 10^{-5}$ Pa to 10 Pa is sufficient.

An aluminum alloy plate comprising an oxide film remaining in a part on its surface can be obtained by adjusting the etching amount of the aluminum alloy plate to, for example, 1 nm to 10 nm. According to need, the amount of etching may exceed 10 nm.

The surface of the pure titanium or titanium alloy plate and the surface of the aluminum alloy plate subjected to sputter etching in the manner described above are pressure-bonded, for example roll-bonded to each other at a reduction ratio of the aluminum alloy layer of 7% or higher and a reduction ratio of the roll-bonded laminate of 20% or lower. Thus, the pure titanium or titanium alloy plate is bonded to the aluminum alloy plate.

A reduction ratio of an aluminum alloy layer is 7% or higher, preferably 8% or higher, and more preferably 9% or higher. When the reduction ratio of the aluminum alloy layer is 7% or higher, the peel strength of the resulting roll-bonded laminate can be enhanced to 40 N/20 mm or higher. In particular, a range of an improvement in the peel strength before annealing to that after annealing is enhanced to a significant extent, compared with the case in which the reduction ratio of the aluminum alloy layer is lower than 7%. The reduction ratio of the aluminum alloy layer can be determined in the same manner as with the case of the roll-bonded laminate according to the first embodiment.

The upper limit of the reduction ratio of the aluminum alloy layer is not particularly limited. For example, it is preferably 30% or lower, and more preferably 20% or lower. In order to suppress deformation of the aluminum alloy layer and maintain thickness accuracy, the reduction ratio is particularly preferably lower than 15%. When the reduction ratio of the aluminum alloy layer is lower than such upper limit, the peel strength can be enhanced after thermal treatment, and aluminum alloy layer thickness can be maintained flat.

A reduction ratio of the pure titanium or titanium alloy layer is preferably 8% or higher, more preferably 9% or higher, and further preferably 10% or higher. When the reduction ratio of the pure titanium or titanium alloy layer is 8% or higher, the peel strength of the resulting roll-bonded laminate is likely to be enhanced to 40 N/20 mm or higher. In order to suppress deformation of the pure titanium or titanium alloy layer and maintain thickness accuracy, the reduction ratio is preferably 20% or lower, and more preferably 15% or lower.

The reduction ratio of the roll-bonded laminate is 20% or lower, and preferably 15% or lower. When the reduction ratio of the roll-bonded laminate is 20% or lower, layer deformation can be suppressed, and thickness accuracy can be maintained more sufficiently. While the lower limit is not particularly limited, it is preferably 8% or more, and more preferably 9% or more, on the basis of the reduction ratio of the aluminum alloy layer to achieve the effects of improved peel strength.

A line pressure load for rolling bonding is not particularly limited. It may be determined to achieve a given reduction ratio of the aluminum alloy layer and that of the roll-bonded laminate. For example, a line pressure load can be adjusted within a range of 1.6 tf/cm to 10.0 tf/cm. When a diameter of a pressure roll is 100 mm to 250 mm, for example, a line pressure load for rolling bonding is preferably 1.9 tf/cm to 4.0 tf/cm, and more preferably 2.3 tf/cm to 3.0 tf/cm. When a roll diameter is increased or metal plates are thick before bonding, however, it is occasionally necessary to increase a line pressure load to maintain a pressure that is necessary at the time of bonding, and the line pressure load is not limited to the level mentioned above.

Bonding temperature is not particularly limited. For example, it is ordinary temperature to 150° C.

Bonding is preferably carried out in the non-oxidizing atmosphere, such as in an inert gas atmosphere (e.g., Ar), so as to prevent oxygen from being readsorbed onto the surface of the pure titanium or titanium alloy plate and that of the aluminum alloy plate and to prevent the bonding strength therebetween from lowering.

In the step of annealing, the roll-bonded laminate obtained by bonding the pure titanium or titanium alloy plate to the aluminum alloy plate in the manner described above is subjected to thermal treatment. Thus, adhesion between layers can be improved, and effects of improving the adhesion force can further be enhanced by conducting thermal treatment in conjunction with adjustment of the reduction ratio of the aluminum alloy layer. In addition, such thermal treatment can also serve as annealing of the roll-bonded laminate, in particular, the aluminum alloy layer.

In the case of batch annealing, for example, annealing temperature is 200° C. to 500° C., and preferably 250° C. to 450° C. In the case of continuous annealing, for example, it is 300° C. to 800° C., and preferably 350° C. to 550° C. By adjusting the annealing temperature within such range, the peel strength of the roll-bonded laminate is enhanced to 40 N/20 mm or higher. Such annealing temperature is within a nonrecrystallized temperature range for pure titanium or titanium alloy. That is, pure titanium or titanium alloy is not substantially softened at such temperature. In the case of aluminum alloy, work strain is eliminated, and aluminum alloy is softened. In the present invention, the reduction ratio of the aluminum alloy layer and the reduction ratio of the roll-bonded laminate at the time of bonding, and the annealing temperature are adjusted within predetermined ranges. Thus, the peel strength of the roll-bonded laminate is improved to a significant extent.

Through the thermal treatment, titanium and aluminum are thermally diffused alternately. While the peel strength of the roll-bonded laminate of titanium and aluminum is known to be improved via such thermal diffusion, as described above, the present inventors discovered that effects of improvement can vary as a result of thermal diffusion in conjunction with adjustment of the a reduction ratio at the time of roll bonding. The peel strength can be improved in the manner described below. In the present application, thickness of an oxide at the interface between the pure titanium or titanium alloy layer and the aluminum alloy layer is reduced or a metal layer is exposed on the bonding interface. Thus, diffusion is less likely to be inhibited by an oxide layer, diffusion proceeds in a wide area of the bonding interface or into the depth from the interface, and the peel strength is improved to a significant extent. Accordingly, the present invention can provide a roll-bonded laminate exhibiting the peel strength of 40 N/20 mm or higher.

A duration of annealing can be adequately determined in accordance with an annealing method (batch or continuous annealing), annealing temperature, or a size of a roll-bonded laminate subjected to annealing. In the case of batch annealing, for example, temperature of the roll-bonded laminate is raised to a given level, and the roll-bonded laminate is then held at that temperature for 0.5 to 10 hours, and preferably for 2 to 8 hours. If an intermetallic compound is not generated, batch annealing may be carried out for 10 hours or longer. In the case of continuous annealing, temperature of the roll-bonded laminate is raised to a given level, and the roll-bonded laminate is then held at that temperature for 20 seconds to 5 minutes. The term "duration of annealing" refers to a duration after the temperature of the roll-bonded laminate to be subjected to annealing is raised to a given level, and such duration does not include a period during which temperature of the roll-bonded laminate is raised. A duration of annealing may be approximately 1 to 2 minutes when a material is as small as the A4 paper size in the case of batch annealing. In the case of a large material, such as a long coil material with a width of 100 mm or larger and a length of 10 m or longer, batch annealing needs to be carried out for approximately 2 to 8 hours.

VII. Applications of a Roll-Bonded Laminate

The roll-bonded laminate composed of the stainless steel layer and the aluminum alloy or pure aluminum layer according to the present invention can be used as a press-molded part for electronic device and it has high drawing workability. Thus, such roll-bonded laminate can be used as an electronic device housing, and, in particular, a mobile electronic device (mobile terminal) housing. It is difficult to process an outer surface of a housing. When a housing comprising an aluminum layer of aluminum alloy or pure aluminum as an inner surface and a stainless steel layer as an outer surface or a housing comprising a thin stainless steel layer is to be processed, in particular, the stainless steel layer becomes easy to break. With the use of the roll-bonded laminate according to the present invention, however, the stainless steel layer fits the shape of the aluminum layer; that is, the laminate has satisfactory workability. Thus, the housing can be obtained without breaking the stainless steel layer. The housing may be subjected to treatment such as suppression of discoloration or decoration, and applications of the roll-bonded laminate according to the present invention are not limited to the housing according to the embodiment mentioned above. In addition, the roll-bonded laminate composed of the pure titanium or titanium alloy layer and the aluminum alloy layer according to the present invention can be used for various applications, including an electronic device housing.

The electronic device housing preferably comprises the roll-bonded laminate according to the present invention on a back surface and/or a side surface.

Figure 3:
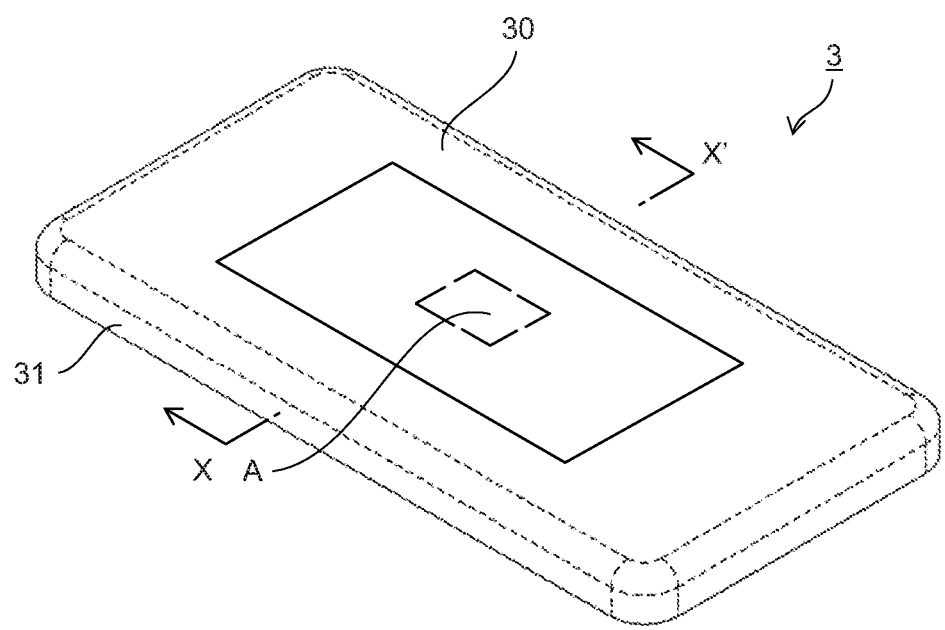
FIG. 3 is a perspective view showing the electronic device housing according to the first embodiment of the present invention.
Figure 4:
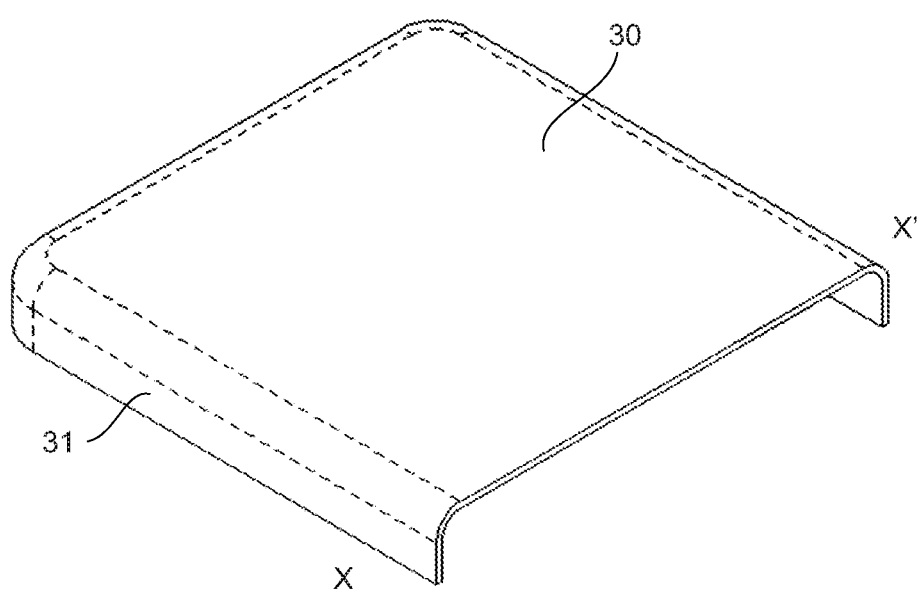
FIG. 4 is a perspective, cross-sectional view showing the electronic device housing according to the first embodiment of the present invention taken in the X-X' direction.

FIG. 3 and FIG. 4 show a first embodiment of the electronic device housing using the roll-bonded laminate according to the present invention. FIG. 3 shows a perspective view of the electronic device housing using the roll-bonded laminate according to the first embodiment of the present invention, and FIG. 4 shows a perspective, cross-sectional view of the electronic device housing using the roll-bonded laminate according to the first embodiment of the present invention taken in the X-X' direction. An electronic device housing 3 is composed of a back surface 30 and a side surface 31, and the entire back surface 30 and side surface 31 or a part thereof can comprise the roll-bonded laminate according to the present invention. The "back surface" is a surface opposite from the surface of the housing constituting an electronic device such as a smartphone on which a display (not shown) is provided. The electronic device housing 3 may comprise a metal or plastic material provided on its inner surface separately from the roll-bonded laminate. When the electronic device housing 3 comprises the roll-bonded laminate on the back surface 30, it is sufficient if the entire back surface 30 or a part thereof (e.g., a plane region of 2 cm×2 cm or larger, such as a plane region of 25 mm×25 mm, shown as a plane region A in FIG. 3) has the properties as described with regard to the roll-bonded laminate. While the electronic device housing 3 is constituted to comprise the roll-bonded laminate on its back surface 30, the structure of the housing is not limited thereto depending on the structure of the electronic device. The back surface 30 and the side surface 31 may be each composed of the roll-bonded laminate, or the side surface 31 may comprise the roll-bonded laminate.

Subsequently, the electronic device housing using the roll-bonded laminate according to the second embodiment of the present invention is described. According to the present embodiment, an electronic device housing as a central frame is sandwiched by a display such as glass or resin display and a back surface, an electronic device housing is composed of a side surface and an inner reinforcement frame connected to the side surface, and the inner reinforcement frame constitutes the back surface of the electronic device housing. The side surface and the inner reinforcement frame or a part thereof of the electronic device housing can comprise the roll-bonded laminate according to the present invention. The "inner reinforcement frame" is a support plate that is located inside an electronic device such as a smartphone and plays a role for improving rigidity of the entire electronic device and as a support comprising components such as a battery or a printed substrate mounted thereon. In general, the inner reinforcement frame comprises holes for connection or assembly. A hole can be made by press working or other means. According to the present embodiment, the side surface may or may not be integrated with the inner reinforcement frame. Also, the roll-bonded laminate may be selectively used for the side surface. It should be noted that the electronic device housing according to the present embodiment can be adequately deformed in accordance with the structure of the electronic device as with the case of the electronic device housing 3 and that the structure thereof is not limited to those described above.

EXAMPLES

Hereafter, the present invention is described in greater detail with reference to the examples and comparative examples, although the scope of the present invention is not limited to these examples.

Example 1

SUS304 (thickness 0.2 mm) was used as a stainless steel material, and A5052 aluminum alloy (thickness 0.8 mm) was used as an aluminum material. SUS304 and A5052 were subjected to sputter-etching. SUS304 was subjected to sputter-etching at 0.1 Pa and a plasma output of 700 W for 13 minutes, and A5052 was subjected to sputter-etching at 0.1 Pa and a plasma output of 700 W for 13 minutes. After the sputter-etching treatment, SUS304 was roll-bonded to A5052 with a roll diameter of 130 mm to 180 mm at ordinary temperature and a line pressure load of 1.9 tf/cm to 4.0 tf/cm. Thus, the roll-bonded laminate of SUS304 and A5052 was obtained. This roll-bonded laminate was subjected to batch annealing at 300° C. for 2 hours. After annealing, the reduction ratios of the stainless steel layer, the aluminum alloy layer, and the entire roll-bonded laminate were determined based on the thickness of original plates before bonding and thickness of the final form of the roll-bonded laminate. A standard deviation of thickness of the stainless steel layer of the roll-bonded laminate was 0.95 µm. The standard deviation of thickness of the stainless steel layer was determined by obtaining an optical microscopic photograph of a cross section of the roll-bonded laminate, measuring thickness of the stainless steel layer at 10 points at equal intervals on the cross section over a width of 300 µm in the optical microscopic photograph, and calculating from the measured values at 10 point.

Examples 2 to 4 and Comparative Examples 1 and 2

The roll-bonded laminates of Examples 2 to 4 and Comparative Examples 1 and 2 were obtained in the same manner as in Example 1, except that thickness of the original aluminum plate material, the reduction ratio at the time of bonding through the modification of a pressure applied at the time of bonding, and/or annealing temperature were changed to given levels. The standard deviation of thickness of the stainless steel layer was 0.3 to 1.0 µm in Examples 1 to 5 and it was 0.2 µm in Comparative Example 1.

Example 5

SUS304 (thickness 0.25 mm) was used as a stainless steel material, and A5052 aluminum alloy (thickness 0.8 mm) was used as an aluminum material. SUS304 and A5052 were subjected to sputter-etching. SUS304 was subjected to sputter-etching at 0.1 Pa, a plasma output of 4800 W, and a line velocity of 4 m/minute, and A5052 was subjected to sputter-etching at 0.1 Pa, a plasma output of 6400 W, and a line velocity of 4 m/minute. After the sputter-etching treatment, SUS304 was roll-bonded to A5052 at ordinary temperature and a line pressure load of 3.0 tf/cm to 6.0 t/cm. Thus, the roll-bonded laminate of SUS304 and A5052 was obtained. This roll-bonded laminate was subjected to batch annealing at 300° C. for 8 hours.

Concerning the roll-bonded laminates of Examples 1 to 5 and Comparative Examples 1 and 2, the 180° peel strength of the roll-bonded laminates after bonding and before annealing and that of the final form of the roll-bonded laminates after annealing were measured. Concerning the roll-bonded laminates of Examples 1 to 5 and Comparative Examples 1 and 2, in addition, tensile strength and elongation were measured and bending workability and drawing workability were evaluated. Measurement of 180° peel strength, tensile strength and elongation, and evaluation of bending workability and drawing workability were carried out in the manner described below.

[180° Peel Strength]

Test pieces with a width of 20 mm were prepared from the roll-bonded laminates, the stainless steel layer was partly peeled from the aluminum layer, the aluminum layer side was fixed, and the stainless steel layer was pulled toward the direction opposite by 180° from the aluminum layer side at a tensile speed of 50 mm/min, and a force required to peel the stainless steel layer from the aluminum layer (unit: N/20 mm) was measured using a universal testing machine, TENSILON RTC-1350A (manufactured by Orientec Corporation).

[Tensile Strength]

Tensile strength was measured with the use of a universal testing machine, TENSILON RTC-1350A (manufactured by Orientec Corporation) and Special Test Piece No. 6 specified by JIS Z 2201 in accordance with JIS Z 2241 (a method of tensile test for metallic materials).

[Elongation]

With the use of the test piece for the tensile test, elongation was measured in accordance with the method of measurement of elongation at break specified by JIS Z 2241.

[Bending Workability]

The test pieces were bent by a V-block method (a bending angle of 60°; processed with a pressing tool with R of 0.5, a load of 1 kN; test material width of 10 mm; JIS Z 2248).

[Drawing Workability]

With the use of the mechanical Erichsen testing machine (a universal sheet metal testing machine; model: 145-60; Erichsen), cylindrical drawing was performed and evaluated.

Drawing conditions were as follows.

Blank diameter (φ): 49 mm (drawing ratio: 1.63) or 55 mm (drawing ratio: 1.83)
Punch size (φ): 30 mm
Punch shoulder (R): 3.0
Die shoulder (R): 3.0
Wrinkle suppression pressure: 3 N
Lubricant oil: Press oil (No. 640, Nihon Kohsakuyu Co., Ltd.)
Mold temperature: room temperature (25° C.)
Mold velocity: 50 mm/sec Drawing workability was evaluated according to a 5-point scale shown in Table 1 below. A higher numerical value indicates higher drawing workability. With a blank diameter of 55 mm (drawing ratio of 1.83), drawing work is more difficult compared with the case with a blank diameter of 49 mm (drawing ration of 1.63).

TABLE 1

| φ | Drawing ratio | 1 | 2 | 3 | 4 | 5 |
|---|---|---|---|---|---|---|
| 49 | 1.63 | Poor | Good | Good | Good | Excellent |
| 55 | 1.83 | Poor | Fair | Average | Good | Excellent |

Poor: Undrawable; Fair: Drawable with cracks; Average: Drawable with some wrinkles; Good: Drawable; Excellent: Drawable with good appearance Table 2 shows the constitutions, production conditions, and the results of evaluation of the roll-bonded laminates of Examples 1 to 5 and Comparative Examples 1 and 2. FIG. 1 shows the peel strength of the roll-bonded laminates of Examples 1 and 2 and Comparative Example 1 before and after annealing. In FIG. 1, the peel strength before annealing (after bonding) is indicated as 10 N/20 mm for convenience.

TABLE 2

| | Original plate thickness (mm) | | | Rolling reduction ratio (%) | | | Peel strength after bonding (N/20 mm) | Annealing temperature (° C.) | Peel strength after annealing (N/20 mm) | Bending workability | Drawing workability | Elongation (%) | Tensile strength (N) |
|---|---|---|---|---|---|---|---|---|---|---|---|---|---|
| | SUS | Al | Total thickness | SUS | Al | Entire laminate | | | | | | | |
| Ex. 1 | 0.2 | 0.8 | 1 | 2.5 | 6.38 | 5.60 | 10 or lower | 300 | 74.5 | Good | 3 | 55 | 4560 |
| Ex. 2 | 0.2 | 0.8 | 1 | 7 | 9.38 | 8.90 | 10 or lower | 300 | 88 | Good | 4 | 60 | 4561 |
| Ex. 3 | 0.2 | 0.8 | 1 | 7 | 9.38 | 8.90 | 10 or lower | 350 | 136 | Good | 5 | 51.5 | 4570 |
| Ex. 4 | 0.2 | 0.4 | 0.6 | 4 | 6.75 | 5.83 | 10 or lower | 300 | 162 | Good | 5 | 49 | 3520 |
| Ex. 5 | 0.25 | 0.8 | 1.05 | 4 | 8.75 | 7.61 | 10 or lower | 300 | 120 | Good | 5 | 45 | — |
| Comp. Ex. 1 | 0.2 | 0.8 | 1 | 1.5 | 4.88 | 4.20 | 10 or lower | 300 | 34 | Good | 1 | 54 | 4744 |
| Comp. Ex. 2 | 0.2 | 0.8 | 1 | 7 | 9.36 | 8.90 | 10 or lower | 400 | 4 | Poor | — | 61.5 | 4559 |

Table 2 and FIG. 1 demonstrate that, compared with the roll-bonded laminate of Comparative Example 1 in which the reduction ratio of the aluminum alloy layer was lower than 5%, the roll-bonded laminates of Examples 1 and 2 produced by increasing the pressure at the time of bonding to increase the reduction ratio of the aluminum alloy layer would exhibit an equivalent peel strength after bonding and before annealing and significantly improved peel strength and enhanced drawing workability after annealing. According to Examples 2 and 3 and Comparative Example 2, in addition, the peel strength of the roll-bonded laminate after annealing is enhanced at an adequate annealing temperature. In the case of batch annealing, an adequate temperature range is from 200° C. to 370° C. When an aluminum material is thin, the peel strength of the roll-bonded laminate can also be enhanced. In such a case, in particular, a range of improvement in the peel strength before annealing to after annealing was significant (Example 4).

The results demonstrated above were compared with the results attained in Examples 6 and 7 and Comparative Example 3 in which pure aluminum was used. As a result, it was found that the peel strength was less likely to be improved when an aluminum material was aluminum alloy, compared with the case in which an aluminum material was pure aluminum. This is deduced to occur for the following reasons. That is, an aluminum alloy is harder than pure aluminum, it is less likely to be deformed, the peel strength thereof is less likely to be enhanced at the time of bonding, an intermetallic compound is likely to be generated on the bonding interface upon annealing, and the peel strength is deteriorated as a consequence.

Example 6

SUS304 (thickness 0.2 mm) was used as a stainless steel material, and A1050 pure aluminum (thickness 0.85 mm) was used as an aluminum material. SUS304 and A1050 were subjected to sputter-etching. SUS304 was subjected to sputter-etching at 0.1 Pa and a plasma output of 700 W for 13 minutes, and A1050 was subjected to sputter-etching at 0.1 Pa and a plasma output of 700 W for 13 minutes. After the sputter-etching treatment, SUS304 was roll-bonded to A1050 with a roll diameter of 130 mm to 180 mm at ordinary temperature and a line pressure load of 1.9 tf/cm to 4.0 tf/cm. Thus, the roll-bonded laminate of SUS304 and A1050 was obtained. This roll-bonded laminate was subjected to batch annealing at 300° C. for 2 hours.

Example 7 and Comparative Example 3

The roll-bonded laminates of Example 7 and Comparative Example 3 were obtained in the same manner as in Example 6, except that the reduction ratio at the time of bonding through the modification of a pressure applied at the time of bonding and/or annealing temperature were changed to given levels.

Figure 2:
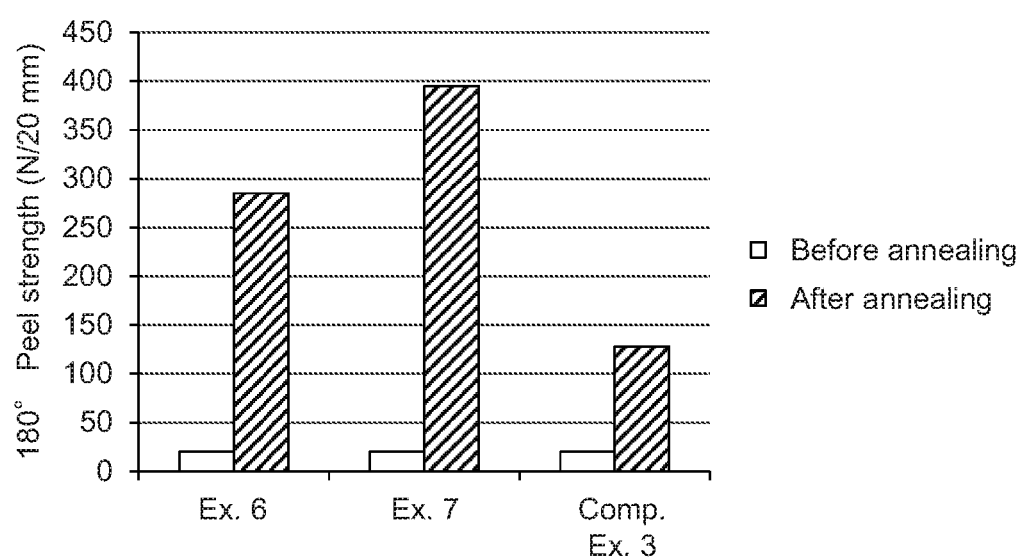
FIG. 2 shows the peel strength of the roll-bonded laminates of Examples 6 and 7 and Comparative Example 3 before and after annealing.

The roll-bonded laminates of Examples 6 and 7 and Comparative Example 3 were evaluated in the manner described above. Table 3 shows the constitutions, production conditions, and the results of evaluation of the roll-bonded laminates of Examples 6 and 7 and Comparative Example 3. FIG. 2 shows the peel strength of the roll-bonded laminates of Examples 6 and 7 and Comparative Example 3 before and after annealing. In FIG. 2, the peel strength before annealing (after bonding) is indicated as 20 N/20 mm for convenience.

TABLE 3

| | Original plate thickness (mm) | | | Rolling reduction ratio (%) | | | Peel strength after bonding (N/20 mm) | Annealing temperature (° C.) | Peel strength after annealing (N/20 mm) | Bending workability | Elongation (%) | Tensile strength (N) |
| --- | --- | --- | --- | --- | --- | --- | --- | --- | --- | --- | --- | --- |
| | SUS | Al | Total thickness | SUS | Al | Entire laminate | | | | | | |
| Ex. 6 | 0.2 | 0.85 | 1.05 | 5 | 13.88 | 12.19 | 15 to 25 | 300 | 285 | Good | 65 | 3388 |
| Ex. 7 | 0.2 | 0.85 | 1.05 | 5 | 13.88 | 12.19 | 15 to 25 | 400 | 395 | Good | 64 | 3286 |
| Comp. Ex. 3 | 0.2 | 0.85 | 1.05 | 1.5 | 9.41 | 7.90 | 15 to 25 | 300 | 128 | Good | 61 | 3542 |

Table 3 and FIG. 2 demonstrate that the laminate comprising pure aluminum as an aluminum material can achieve significantly enhanced peel strength after annealing while peel strength after bonding is equivalent, and a range of improvement in the peel strength before annealing to after annealing can be enlarged by increasing the reduction ratio at the time of bonding, as with the case of the laminate comprising an aluminum alloy as an aluminum material.

Example 8

TP270 pure titanium (thickness 0.2 mm) was used as a titanium material, and A5052 aluminum alloy (thickness 0.6 mm) was used as an aluminum material. TP270 and A5052 were subjected to sputter-etching. TP270 was subjected to sputter-etching at 0.1 Pa and a plasma output of 700 W for 13 minutes, and A5052 was subjected to sputter-etching at 0.1 Pa and a plasma output of 700 W for 13 minutes. After the sputter-etching treatment, TP270 was roll-bonded to A5052 with a roll diameter of 130 mm to 180 mm at ordinary temperature and a line pressure load of 1.9 tf/cm to 4.0 tf/cm. Thus, the roll-bonded laminate of TP270 and A5052 was obtained. This roll-bonded laminate was subjected to batch annealing at 300° C. for 2 hours. Concerning the roll-bonded laminate after annealing, the reduction ratios of the pure titanium layer, the aluminum alloy layer, and the entire roll-bonded laminate were determined based on the thickness of original plates before bonding and thickness of the final form of the roll-bonded laminate.

Comparative Example 4

The roll-bonded laminate of Comparative Example 4 was obtained in the same manner as in Example 8, except that a pressure applied at the time of bonding was changed to adjust the reduction ratio at the time of bonding to a given level.

The roll-bonded laminates of Example 8 and Comparative Example 4 were evaluated in the same manner as with the case of the roll-bonded laminate composed of the stainless steel layer and the aluminum alloy or pure aluminum layer.

Figure 5:
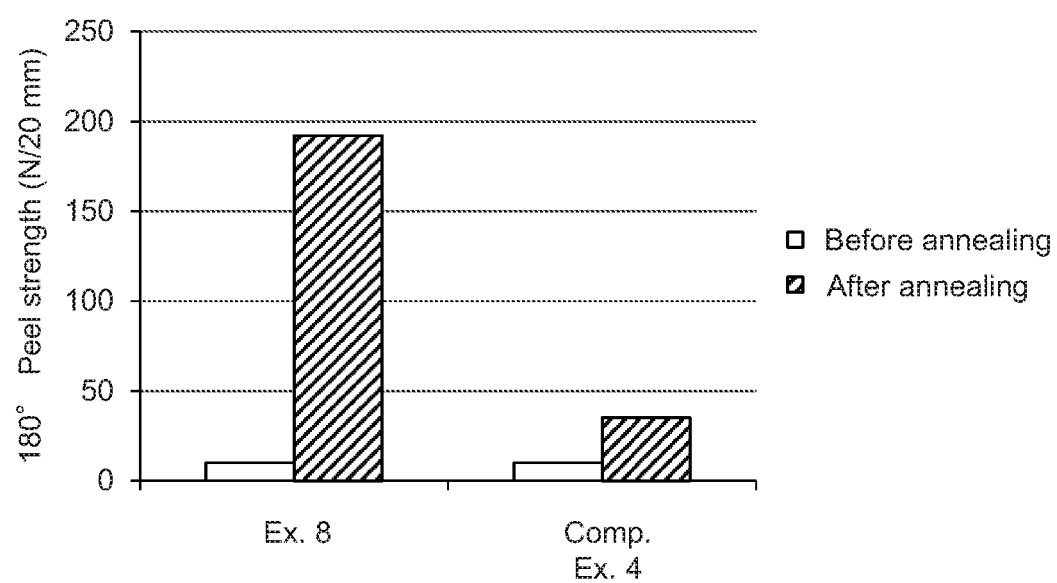
FIG. 5 shows the peel strength of the roll-bonded laminates of Example 8 and Comparative Example 4 before and after annealing.

Table 4 shows the constitutions, production conditions, and the results of evaluation of the roll-bonded laminates of Example 8 and Comparative Example 4. FIG. 5 shows the peel strength of the roll-bonded laminates of Example 8 and Comparative Example 4 before and after annealing. In FIG. 5, the peel strength before annealing (after bonding) is indicated as 10 N/20 mm for convenience.

TABLE 4

| | Original plate thickness (mm) | | | Rolling reduction ratio (%) | | | Bonding condition Pressure | Peel strength after bonding (N/20 mm) | Annealing Temperature (° C.) | Peel strength after annealing (N/20 mm) | Bending work-ability | Elong-ation (%) | Tensile strength (N) | Thickness after rolling (mm) |
|---|---|---|---|---|---|---|---|---|---|---|---|---|---|---|
| | Ti | Al | Total thickness | Ti | Al | Entire laminate | | | | | | | | |
| Ex. 8 | 0.2 | 0.6 | 0.8 | 11.99 | 11.52 | 11.63 | High | 10 or lower | 300 | 192 | Good | 29.1 | 2755 | 0.707 |
| Comp. Ex. 4 | 0.2 | 0.6 | 0.8 | 7.91 | 6.43 | 7.00 | Low | 10 or lower | 300 | 35 | Good | 31.5 | 2810 | 0.744 |

Table 4 and FIG. 5 demonstrate that the roll-bonded laminate composed of pure titanium and aluminum alloy can achieve significantly enhanced peel strength after annealing while peel strength after bonding is equivalent, and a range of improvement in the peel strength before annealing to after annealing can be enlarged by increasing the reduction ratio at the time of bonding.

REFERENCE SIGNS LIST

3: Electronic device housing
30: Back surface
31: Side surface
A: Plane region

All publications, patents, and patent applications cited herein are incorporated herein by reference in their entirety.

The invention claimed is:

1. A roll-bonded laminate, comprising:
a stainless steel layer and an aluminum alloy layer,
wherein the aluminum alloy layer contains one or more additive metal elements selected from Mg, Mn, Si, and Cu, the total content of the additive metal elements exceeds 1% by mass, and a peel strength of the roll-bonded laminate is 60 N/20 mm or higher;
wherein the aluminum alloy layer has a thickness of 0.01 mm to 2.5 mm;
wherein a reduction ratio of the aluminum alloy layer is 5% or higher, and a reduction ratio of the roll-bonded laminate is 15% or lower; and
wherein the roll-bonded laminate is batch annealed at 200° C. to 370° C., or continuously annealed at 300° C. to 800° C.

2. The roll-bonded laminate according to claim 1, wherein elongation measured by a tensile test is 35% or higher.

3. The roll-bonded laminate according to claim 2, wherein tensile strength measured by a tensile test with the use of Specimens No. 6 specified by JIS Z 2201 is 3,000 N or higher.

4. The roll-bonded laminate according to claim 1, wherein a limiting drawing ratio is 1.20 or higher.

5. The roll-bonded laminate according to claim 1, wherein a standard deviation of thickness of the stainless steel layer is 2.0 μm or lower.

6. The roll-bonded laminate according to claim 1, wherein the aluminum alloy layer has a thickness larger than a thickness of the stainless steel layer.

7. The roll-bonded laminate according to claim 1, wherein the aluminum alloy layer contains Mg in an amount of 0.3% by mass or more.

8. The roll-bonded laminate according to claim 1, wherein the aluminum alloy layer has a thickness of more than 0.5 mm to 2.5 mm or less.

9. A method for producing a roll-bonded laminate, comprising:
subjecting a surface of a stainless steel plate and a surface of an aluminum alloy plate to be bonded to each other to sputter etching, wherein the aluminum alloy plate contains one or more additive metal elements selected from Mg, Mn, Si, and Cu, the total content of the additive metal elements exceeds 1% by mass, and a peel strength of the roll-bonded laminate is 60 N/20 mm or higher, and wherein the aluminum alloy plate has a thickness of 0.01 mm to 2.5 mm;
pressure bonding the surfaces subjected to sputter etching to each other at a reduction ratio of the aluminum alloy plate of 5% or higher and a reduction ratio of the roll-bonded laminate of 15% or lower; and
performing batch annealing at 200° C. to 370° C. or continuous annealing at 300° C. to 800° C.

* * * * *